April 10, 1928.  
H. H. TIMKEN  
AXLE CONSTRUCTION  
Filed July 16, 1926  
1,665,332  
2 Sheets-Sheet 1

INVENTOR:  
Henry H. Timken  
by Carnot & Carnot  
HIS ATTORNEYS.

April 10, 1928.  1,665,332
H. H. TIMKEN
AXLE CONSTRUCTION
Filed July 16, 1926   2 Sheets-Sheet 2
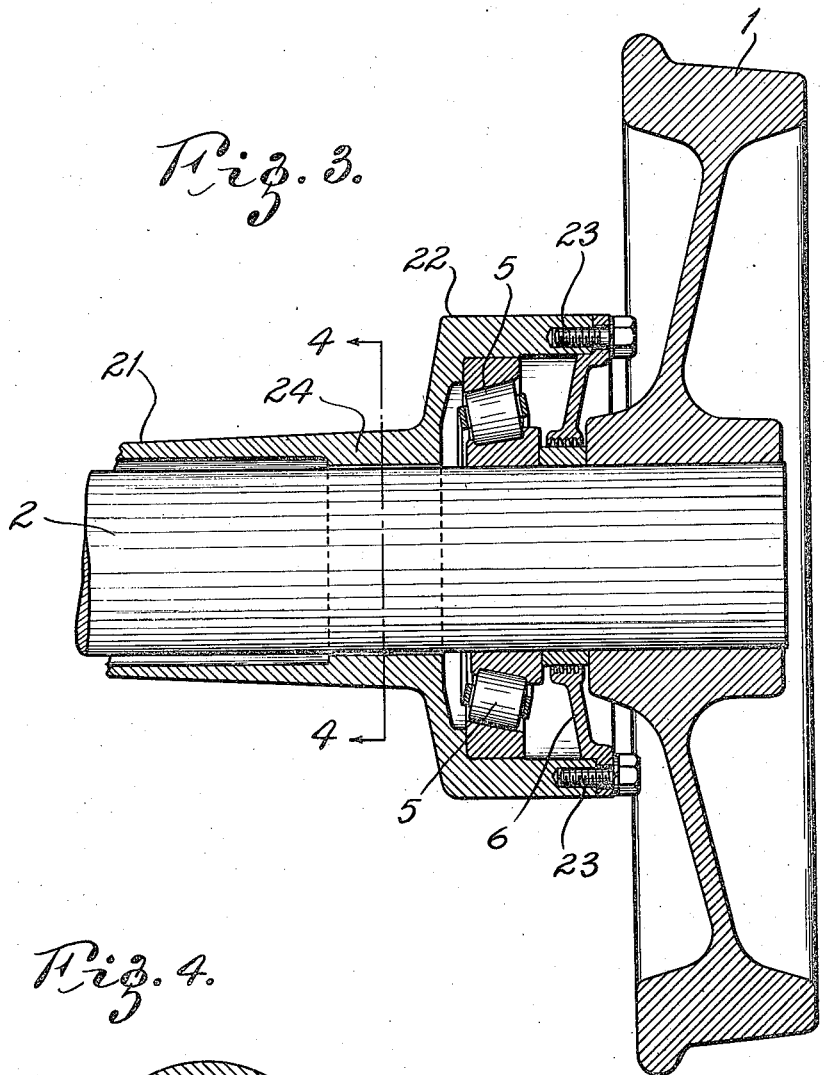
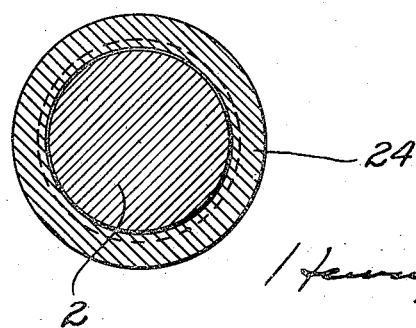

Patented Apr. 10, 1928.

1,665,332

UNITED STATES PATENT OFFICE.

HENRY H. TIMKEN, OF CANTON, OHIO, ASSIGNOR TO THE TIMKEN ROLLER BEARING COMPANY, OF CANTON, OHIO, A CORPORATION OF OHIO.

AXLE CONSTRUCTION.

Application filed July 16, 1926. Serial No. 122,746.

My invention relates to axle constructions, particularly to railway car axles provided with roller bearings; and has for its principal object to prevent failure of the axle in the event of failure of one of said roller bearings.

In ordinary roller bearing car axle constructions, failure of a roller bearing, due to breaking of rollers or other cause, frequently results in a deep groove being cut in the axle, weakening the axle to such an extent that it is apt to break. In order to prevent this, the present invention provides the housings in which the roller bearings are mounted with portions or members normally out of contact with the axle, so as not to interfere with the rotation thereof, but adapted, in the event of failure of a roller bearing, to seize the axle and prevent its further rotation. This will prevent the grooving and breaking of the axle above described. The invention further consists in the car axle and in the parts and combinations and arrangement of parts hereinafter described and claimed.

Figure 1:
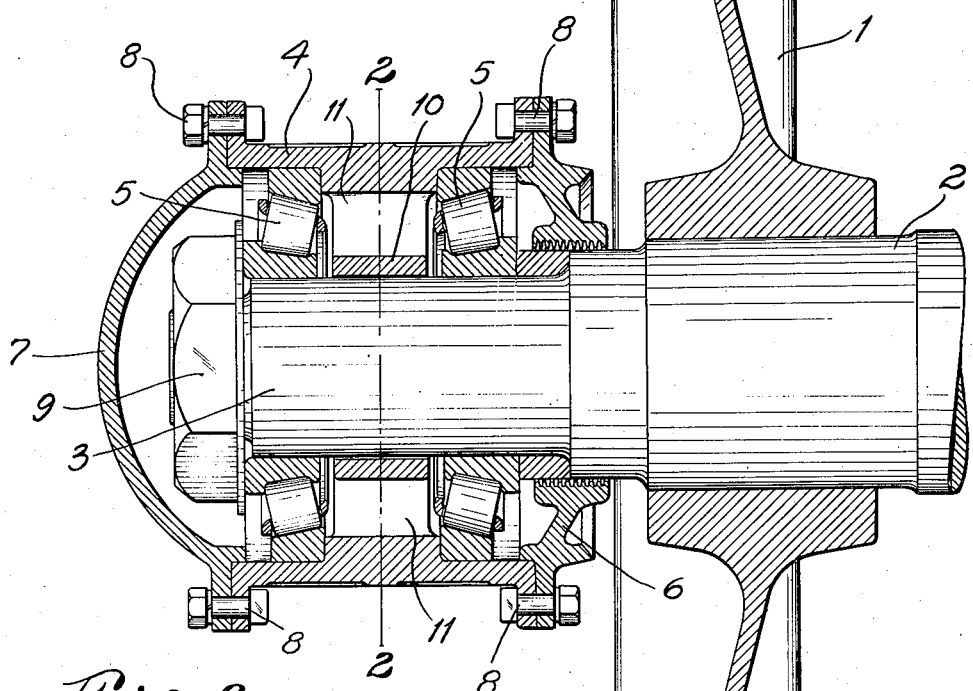
Figure 2:
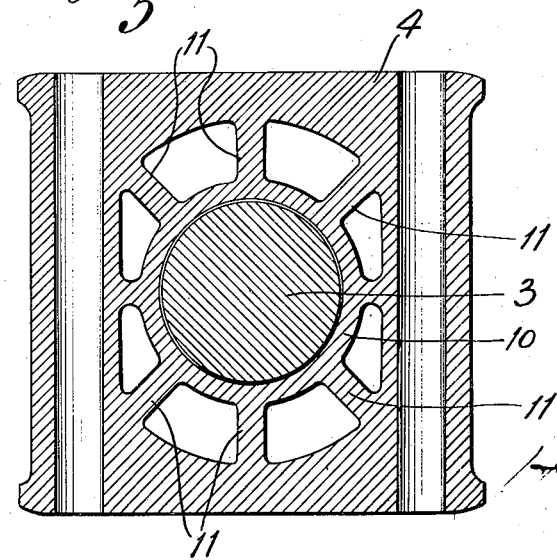

In the accompanying drawings, which form part of this specification and wherein like reference characters indicate like parts wherever they occur, Fig. 1 is a longitudinal sectional view of one end of an axle embodying my invention, said axle being a railway car axle of the outboard truck type, Fig. 2 is a cross sectional view on the line 2—2 in Fig. 1, Fig. 3 is a longitudinal sectional view of one end of an inboard truck type of axle embodying my invention, Fig. 4 is a cross sectional view on the line 4—4 in Fig. 3.

A car wheel 1 is fixed on an axle 2 to rotate therewith. In the construction shown in Figs. 1 and 2, the wheel 1 is spaced from the end 3 of the axle 2 and the end of said axle extends into a housing 4 or journal box, conical roller bearings 5 being interposed between the ends of said journal box 4 and the axle 2. An annular closure ring 6 is provided for the inner end of the journal box and a closure cap 7 for the outer end thereof, said ring and said cap being secured to the journal box, as by bolts 8. A nut 9 is provided at the end of the axle for holding the bearings in place.

The middle portion of the housing has an annular portion 10 that extends around the axle and is normally slightly spaced therefrom, said annular portion being connected to the body of the housing by radially extending ribs 11. This annular portion 10 does not interfere with the normal rotation of the axle.

In the event of failure of one of the roller bearings 5, the journal box 4 (carrying the weight of the car body) will drop down on the axle 2, thus bringing a portion of the ring 10 into engagement with the axle 2. Said ring is of iron or steel and will tend to seize or bind when it engages the axle. If the axle rotates in said ring 10, chips or shavings may be worn from the ring or the axle or both. These chips will fill up the space between the ring 10 and the axle 2 and will prevent rotation of the axle in the journal box or housing. This will cause the wheel to be dragged along the rail, but will prevent the breaking of the axle and the consequent wrecking of the car.

Figures 3 and 4 show an axle construction of the inboard truck type in which the wheel 1 is secured on the end of the axle 2, the body of the axle being enclosed in an axle housing 21. Said axle housing has enlarged end portions 22 in each of which is disposed a roller bearing 5. The end of the housing is closed by a closure ring 6 that is secured thereto as by screws 23.

Adjacent to each of the enlarged end portions 22 in which the bearings 5 are mounted, the tubular housing is provided with a thickened portion 24 having a bore considerably smaller than the normal bore of the housing and spaced only a slight distance away from the axle 2. As in the construction above described, failure of a roller bearing will result in the portion of the housing having a small bore coming into contact with the axle and seizing it to prevent rotation thereof.

The constructions hereinbefore described have the very great advantage of insuring against the breakage of axles in roller bearing axle constructions. Obviously the exact location and construction of the member that engages the axle in the event of failure of roller bearing is not an essential feature of the invention; and I do not wish to be limited to the precise construction shown.

What I claim is:

1. A car axle construction comprising an axle, a housing therefor and a roller bearing interposed between said housing and said axle, said housing having an annular portion of steel or iron surrounding said axle and normally slightly spaced therefrom, whereby, in the event of failure of said roller bearing, said annular portion engages said axle to prevent rotation thereof.

2. A car axle construction comprising an axle, a housing therefor, a roller bearing interposed between said housing and said axle, said housing having a portion composed mainly of iron and located adjacent to said bearing and normally slightly spaced above said axle whereby, in the event of failure of said roller bearing, said annular member engages said axle to prevent rotation thereof.

3. A car axle construction comprising an axle, a housing for the end thereof comprising recesses in the ends of said housing and a hollow iron hub between said recesses, conical bearing cups in said recesses, bearing cones on the end portion of said axle and taper rollers interposed between said cups and cones, said hub having a bore of slightly greater diameter than the end portion of said axle so as normally to be clear of said axle and adapted to bind said axle in case the rollers fail.

Signed at Canton, Ohio, this 12th day of July, 1926.

HENRY H. TIMKEN.